US011232686B2

(12) United States Patent
Pettersson

(10) Patent No.: US 11,232,686 B2
(45) Date of Patent: Jan. 25, 2022

(54) REAL-TIME DEVIATION IN VIDEO MONITORING

(71) Applicant: Axis AB, Lund (SE)

(72) Inventor: Mattias Pettersson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/729,985

(22) Filed: Dec. 30, 2019

(65) Prior Publication Data

US 2021/0201639 A1    Jul. 1, 2021

(51) Int. Cl.
*H04N 21/2385* (2011.01)
*H04N 21/2387* (2011.01)
*G08B 13/196* (2006.01)
*H04N 21/2187* (2011.01)
*H04N 21/24* (2011.01)
*H04N 21/2662* (2011.01)

(52) U.S. Cl.
CPC . *G08B 13/19604* (2013.01); *G08B 13/19667* (2013.01); *H04N 21/2187* (2013.01); *H04N 21/2401* (2013.01); *H04N 21/2662* (2013.01)

(58) Field of Classification Search
CPC ........ H04N 21/2402; H04N 21/64738; H04N 21/26216; H04N 21/2385; H04N 21/2387; H04N 21/2187; H04N 21/2401; H04N 21/2662; H04L 65/4084; H04L 65/80; H04L 65/4092; H04L 65/607; H04L 65/60; G08B 13/19604; G08B 13/19667
See application file for complete search history.

(56) References Cited

U.S. PATENT DOCUMENTS

| 6,356,309 B1 | 3/2002 | Masaki et al. |
| 10,038,858 B1 | 7/2018 | Anderson |
| 10,506,237 B1 | 12/2019 | Liu et al. |
| 2003/0159152 A1* | 8/2003 | Lin ................ H04N 21/440281 725/87 |
| 2010/0166056 A1* | 7/2010 | Perlman ................. H04N 19/61 375/240.01 |

(Continued)

FOREIGN PATENT DOCUMENTS

| CA | 2776283 A1 | 4/2011 |
| EP | 3343937 A1 | 7/2018 |
| WO | 2011133720 A2 | 10/2011 |

OTHER PUBLICATIONS

Extended European Search Report issued in corresponding European Application No. 20153030.0, dated Apr. 30, 2020, 9 pages.

*Primary Examiner* — Patrick E Demosky
(74) *Attorney, Agent, or Firm* — Snyder, Clark, Lesch & Chung, LLP

(57) ABSTRACT

A method may include transmitting a video stream of a live scene over a network at a real-time transmission speed and detecting an event associated with the video stream being transmitted. The method may include transmitting the video stream over the network at a speed lower than the real-time transmission speed during the event. Transmitting the video stream at the speed lower than the real-time transmission speed may introduce a time stretch for the video stream to be played in slow motion. The method may include reducing a bitrate of the video stream after the event and transmitting the video stream with the reduced bitrate over the network after the event to compensate for the time stretch.

20 Claims, 13 Drawing Sheets

(56) References Cited

U.S. PATENT DOCUMENTS

| | | | |
|---|---|---|---|
| 2010/0268836 A1* | 10/2010 | Jabri | H04L 47/38 |
| | | | 709/231 |
| 2015/0188966 A1 | 7/2015 | Eyler et al. | |
| 2017/0264903 A1 | 9/2017 | Sakazume | |
| 2017/0304725 A1* | 10/2017 | Perlman | H04N 19/61 |
| 2018/0070056 A1 | 2/2018 | Deangelis et al. | |
| 2018/0302455 A1 | 10/2018 | Bordoloi | |
| 2018/0309986 A1 | 10/2018 | Edpalm | |
| 2020/0145701 A1* | 5/2020 | Liu | H04N 9/8205 |

* cited by examiner

REAL-TIME DEVIATION IN VIDEO MONITORING

FIELD

This disclosure generally relates to video monitoring.

BACKGROUND INFORMATION

In a video management system, an operator (e.g., a security guard) may view many different video streams covering many different monitored areas. In addition to monitoring video streams, the operator may also be responsible for responding to alerts associated with events occurring in those monitored areas. For example, monitored areas may have temperature sensors, motion detectors, arrival sensors, presence sensors, door open/closed (e.g., contact) sensors, light sensors, etc. The operator may be alerted to motion in a monitored area and/or a door open condition.

DETAILED DESCRIPTION

Figure 1:
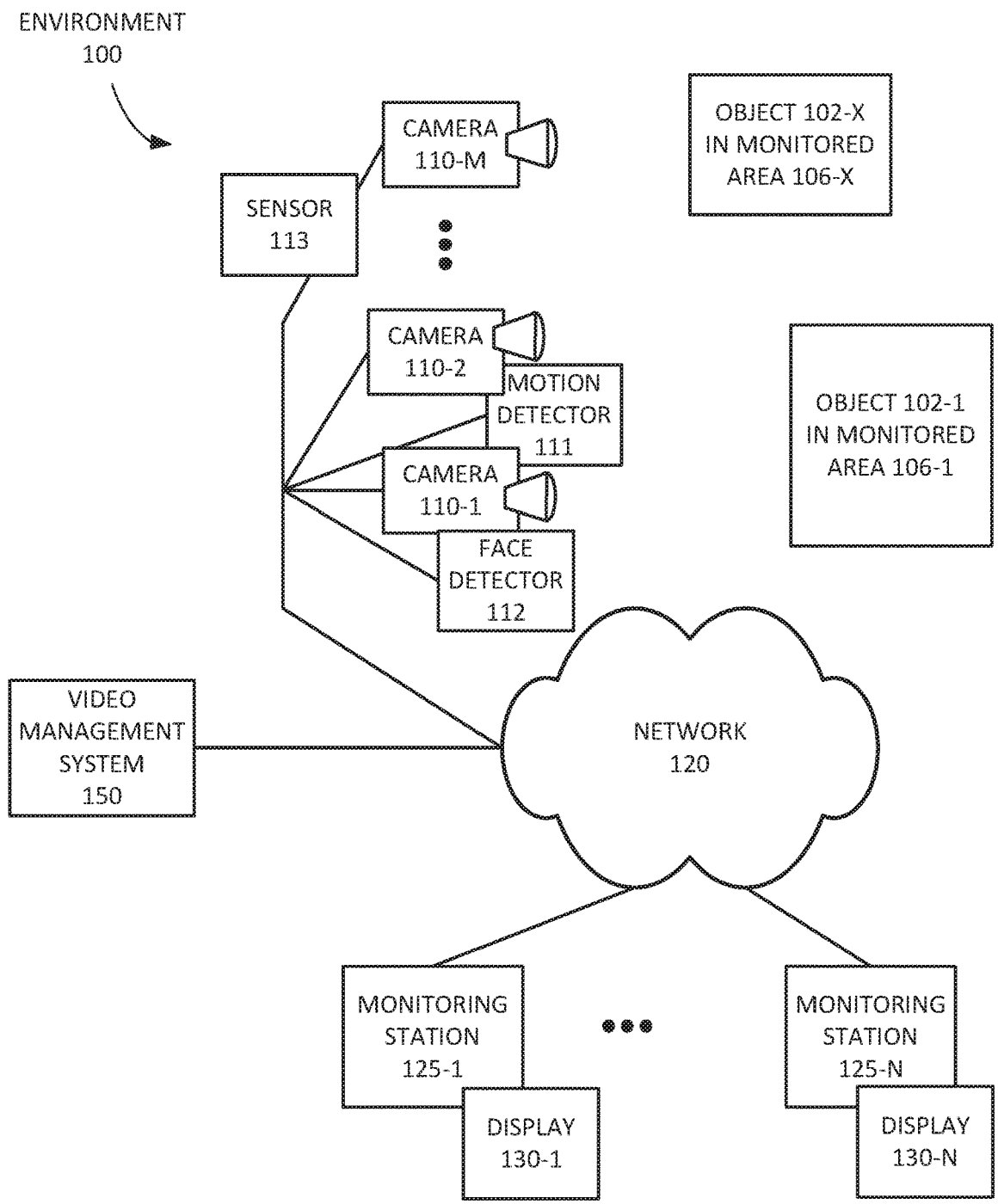
FIG. 1 is a block diagram illustrating an exemplary environment in one embodiment.

The following detailed description refers to the accompanying drawings. The same reference numbers in different drawings identify the same or similar elements.

As noted above, operators sit at monitoring stations to monitor video streamed from security cameras. A problem may arise in a monitoring system when "events" occur, such as motion in a monitored area. Motion may cause the video stream bitrate to temporarily increase because the additional information needs to be encoded. The increased may result in lost packets because the increased bitrate may be higher than the network capacity. As a result, the video may be compromised at precisely the moment of most interest to an operator. Some monitoring systems may reduce the quality of the video to prevent the bitrate from increasing (e.g., by reducing framerate, image quality, or motion capture). This results in lower quality video at precisely the moment of most interest to the operator.

Embodiments disclosed below may enable a monitoring system to increase a video stream bitrate (e.g., to include additional motion information without necessarily overwhelming the network and dropping packets. Instead, the embodiments described below may enable the operator to view the event at with the higher bitrate in slow motion, for example.

A method may include transmitting a video stream of a live scene over a network at a real-time transmission speed and detecting an event associated with the video stream being transmitted, wherein the event has a start time and an end time in the video stream. The method may also include transmitting the video stream over the network at a speed lower than the real-time transmission speed during the event, wherein transmitting the video stream at the speed lower than the real-time transmission speed introduces a time stretch for the video stream to be played in slow motion, and reducing a bitrate of the video stream after the event and transmitting the video stream with the reduced bitrate over the network after the event to compensate for the time stretch. This embodiment may enable, for example, additional information to be encoded (e.g., motion information) rather than being lost (e.g., packet loss or encoding to an otherwise lower bitrate). This embodiment may enable an operator to view the video stream (including the additional information) in slow motion.

Transmitting the video stream with the reduced bitrate may include transmitting the video stream with the reduced bitrate at a speed above the real-time transmission speed after the event to compensate for the time stretch. This embodiment may enable compensation for the time stretch and may enable the operator to view the video in fast motion. The method may include buffering the video stream during the event in a buffer, wherein the buffer is an application-layer buffer. This embodiment may enable decisions regarding buffering to be performed for a particular video stream rather than on a network level that may include multiple video streams or other information.

The method may include determining a channel capacity corresponding to a maximum transmission speed of a channel in the network for transmitting the video stream. Transmitting the video stream over the network at the real-time transmission speed may include transmitting the video stream over the network at the channel capacity. This embodiment may enable transmission of the video stream at or near the channel capacity while still allowing for the video stream bitrate to exceed the channel capacity during an event, for example.

The method may include receiving the video stream, corresponding to time during the event, over the network at below the real-time transmission speed, and displaying video corresponding to time during the event on a display in slow-motion corresponding to the time stretch. This embodiment may enable an operator to view the additional information encoded in the video stream (e.g., motion) during an event.

The method may include receiving the video stream, corresponding to time after the event, over the network at above the real-time transmission speed, and displaying video corresponding to after the event on a display in fast motion. This embodiment may enable an operator to "catch up" to real-time viewing in the video stream after an event.

The transmitted video stream has a first bitrate before the event and a second bitrate during the event. In one embodiment, the second bitrate is higher than the first bitrate. The transmitted video stream has a first bitrate before the event and a third bitrate after the event. The third bitrate corresponds to the reduced bitrate, and in one embodiment the third bitrate is lower than the first bitrate. Reducing the bitrate of the video stream may include reducing a quality factor of the video stream. Reducing the quality factor of the video stream may include reducing a framerate, a quantization parameter, or a resolution of images in the video stream.

Detecting the event of interest associated with the video stream may include detecting motion in video of the video stream, detecting a bitrate increase in the video stream, receiving an event message in a control system, or receiving an event message in a physical-access control system. This embodiment may enable a monitoring system to capture additional information in a video stream (e.g., such as motion or improved quality) while still enabling transmission of this information when a bitrate of the video stream is greater than the channel capacity.

A device may include a transmitter and a processor. The transmitter may transmit a video stream of a live scene over a network at a real-time transmission speed; and the processor may detect an event associated with the video stream being transmitted. The event has a start time and an end time in the video stream. The transmitter may transmit the video stream over the network at a speed lower than the real-time transmission speed during the event, wherein when the video stream is transmitted at the speed lower than the real-time transmission speed a time stretch is introduced for the video stream to be played in slow motion. The processor may reduce a bitrate of the video stream after the event and the transmitter may transmit the video stream with the reduced bitrate over the network after the event to compensate for the time stretch. This embodiment may enable, for example, additional information to be encoded (e.g., motion information) rather than being lost (e.g., packet loss or encoding to an otherwise lower bitrate). This embodiment may enable an operator to view the video stream (including the additional information) in slow motion.

In one embodiment, the transmitter may transmit the video stream with the reduced bitrate by transmitting the video stream with the reduced bitrate at a speed above the real-time transmission speed after the event to compensate for the time stretch. This embodiment may enable compensation for the time stretch and may enable the operator to view the video in fast motion. The device may include a buffer to buffer the video stream during the event in a buffer. In one embodiment, the buffer is an application-layer buffer. This embodiment may enable decisions regarding buffering to be performed for a particular video stream rather than on a network level that may include multiple video streams or other information.

The processor may be configured to determine a channel capacity corresponding to a maximum transmission speed of a channel in the network for transmitting the video stream. The transmitter may transmit the video stream over the network at the real-time transmission speed by transmitting the video stream over the network at the channel capacity. This embodiment may enable transmission of the video stream at or near the channel capacity while still allowing for the video stream bitrate to exceed the channel capacity during an event, for example.

The device may be associated with a receiver to receive the video stream, corresponding to time during the event, over the network at below the real-time transmission speed.

The device may be associated with a display to display video corresponding to time during the event on a display in slow-motion corresponding to the time stretch. In one embodiment, the transmitter may transmit the video stream with the reduced bitrate by transmitting the video stream with the reduced bitrate at a speed above the real-time transmission speed after the event to compensate for the time stretch. This embodiment may enable an operator to view the additional information encoded in the video stream (e.g., motion) during an event.

The receiver may receive the video stream, corresponding to time after the event, over the network at above the real-time transmission speed, and the display may display video corresponding to after the event on a display in fast motion. This embodiment may enable an operator to "catch up" to real-time viewing in the video stream after an event.

The transmitted video stream has a first bitrate before the event and a second bitrate during the event. In one embodiment, the second bitrate is higher than the first bitrate. The transmitted video stream has a first bitrate before the event and a third bitrate after the event. In one embodiment, the third bitrate corresponds to the reduced bitrate, and the third bitrate is lower than the first bitrate.

The processor may reduce the bitrate of the video stream by reducing a quality factor of the video stream. The processor may reduce the quality factor of the video stream by reducing a framerate, a quantization parameter, or a resolution of images in the video stream. The processor may be configured to detect the event of interest associated with the video stream by detecting motion in video of the video stream, detecting a bitrate increase in the video stream, receiving an event message in a control system, or receiving an event message in a physical-access control system. This embodiment may enable a monitoring system to capture additional information in a video stream (e.g., such as motion or improved quality) while still enabling transmission of this information when a bitrate of the video stream is greater than the channel capacity.

FIG. 1 is a block diagram illustrating an exemplary environment 100 in one embodiment. Environment 100 may be, for example, a monitoring system to secure an area or provide public safety. As shown in FIG. 1, environment 100 may include cameras 110-1 through 110-M, network 120, a video management system (VMS) 150, monitoring stations 125-1 through 125-N, and/or displays 130-1 through 130-N. Environment 100 may also include a motion detector 111, a smoke detector 112, and/or a sensor 113.

Cameras 110-1 through 110-M (singular "camera 110," or plural "cameras 110") capture images and/or video of monitored areas 106. An area 106 may include a "live scene" or a "live event" meaning that the captured video stream represents the live scene or the live event. A monitored area 106 may be monitored by one or more cameras 110. For example, camera 110-1 and camera 110-2 monitor area 106-1, which includes an object 102-1. Objects 102 may include any object discernable in the video stream, such as, for example, a door, a person, an animal, a vehicle, a license plate on a vehicle, etc.

Camera 110 may capture image data using visible light, infrared light, and/or other non-visible electromagnetic radiation (e.g., ultraviolet light, far infrared light, terahertz radiation, microwave radiation, etc.). Camera 110 may include a thermal camera and/or a radar for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 may include sensors that generate data arranged in one or more two-dimensional array(s) (e.g., image data or video data). As used herein, "video data", "video stream", and "video" may be referred to more generally as "image data" and "image," respectively. Thus, "image data" or an "image" is meant to include "video data", "video stream", and "video" unless stated otherwise. Likewise, "video data", "video stream", or "video" may include a still image unless stated otherwise.

Other monitoring devices or sensors may capture information from monitored areas 106. For example, a motion detector 111 (e.g., which may include a device other than a camera) may detect motion in area 106-1. Motion detector 111 may include a proximity sensor, a magnetic sensor, an intrusion sensor, a pressure sensor, an infrared light sensor, a radar sensor, and/or a radiation sensor. Smoke detector 112 may detect smoke in area 106-1. Smoke detector 112 may also include a heat sensor. Sensor 113 may include any type of sensor, including a proximity sensor to determine, for example, when a door or window is open or shut, or has opened or shut.

Monitoring stations 125-1 through 125-N are coupled to displays 130-1 through 130-N (singular "monitoring station 125" and "display 130," respectively). Monitoring station 125 and display 130 enable operators (not shown in FIG. 1) to view images from cameras 110. Each monitoring station 125 and display 130 may be a "client" for an operator to interact with the monitoring system shown in environment 100.

Display 130 may receive and display video stream(s) from one or more cameras 110. A single display 130 may show images from a single camera 110 or from multiple cameras 110 (e.g., in multiple frames or windows on display 130). A single display 130 may also show images from a single camera but in different frames. That is, a single camera may include a wide-angle or fisheye lens, for example, and provide images of multiple areas 106. Images from the different areas 106 may be separated and shown on display 130 separately in different windows and/or frames. Display 130 may include a liquid-crystal display (LCD), a light-emitting diode (LED) display, an organic LED (OLED) display, a cathode ray tube (CRT) display, a plasma display, a laser video display, an electrophoretic display, a quantum dot display, a video projector, and/or any other type of display.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

VMS 150 may include one or more computer devices, such as, for example, server devices, which coordinate operation of cameras 110 and/or displays 130. VMS 150 may receive and store image data from cameras 110. VMS 150 may also provide a user interface for operators of monitoring stations 125 to view image data stored in VMS 150 or image data streamed from cameras 110. VMS 150 may include a rule engine to receive notifications of events from cameras 110 and determine whether these notifications invoke a rule (e.g., meet criteria) to perform an operation (e.g., generate an alarm). For example, if camera 110 detects motion in area 106, camera 110 may notify VMS 150. As a result of a rule, the rule engine in VMS 150 may send an alarm to display 130 at monitoring station 125 through network 120. Events (and their notifications) may be triggered by devices and sensors in environment 100 other than cameras 110. For example, environment may include motion detectors, photodetectors, etc., that can generate notifications of events.

In some embodiments, environment 100 does not include a separate VMS 150. Instead, the services provided by VMS 150 are provided by monitoring stations 125 and/or cameras 110 themselves or in a distributed manner among the devices in environment 100. For example, cameras 110 may include a rule engine to determine when notifications of events invoke a rule to perform an operation (e.g., set off an alarm based on detected motion). Likewise, VMS 150 may perform operations described as performed by camera 110. For example, VMS 150 may analyze image data to detect motion rather than camera 110.

Although FIG. 1 shows exemplary components of environment 100, in other implementations, environment 100 may include fewer components, different components, differently arranged components, or additional components than depicted in FIG. 1. Additionally or alternatively, any one device (or any group of devices) may perform functions described as performed by one or more other devices.

Figure 2:
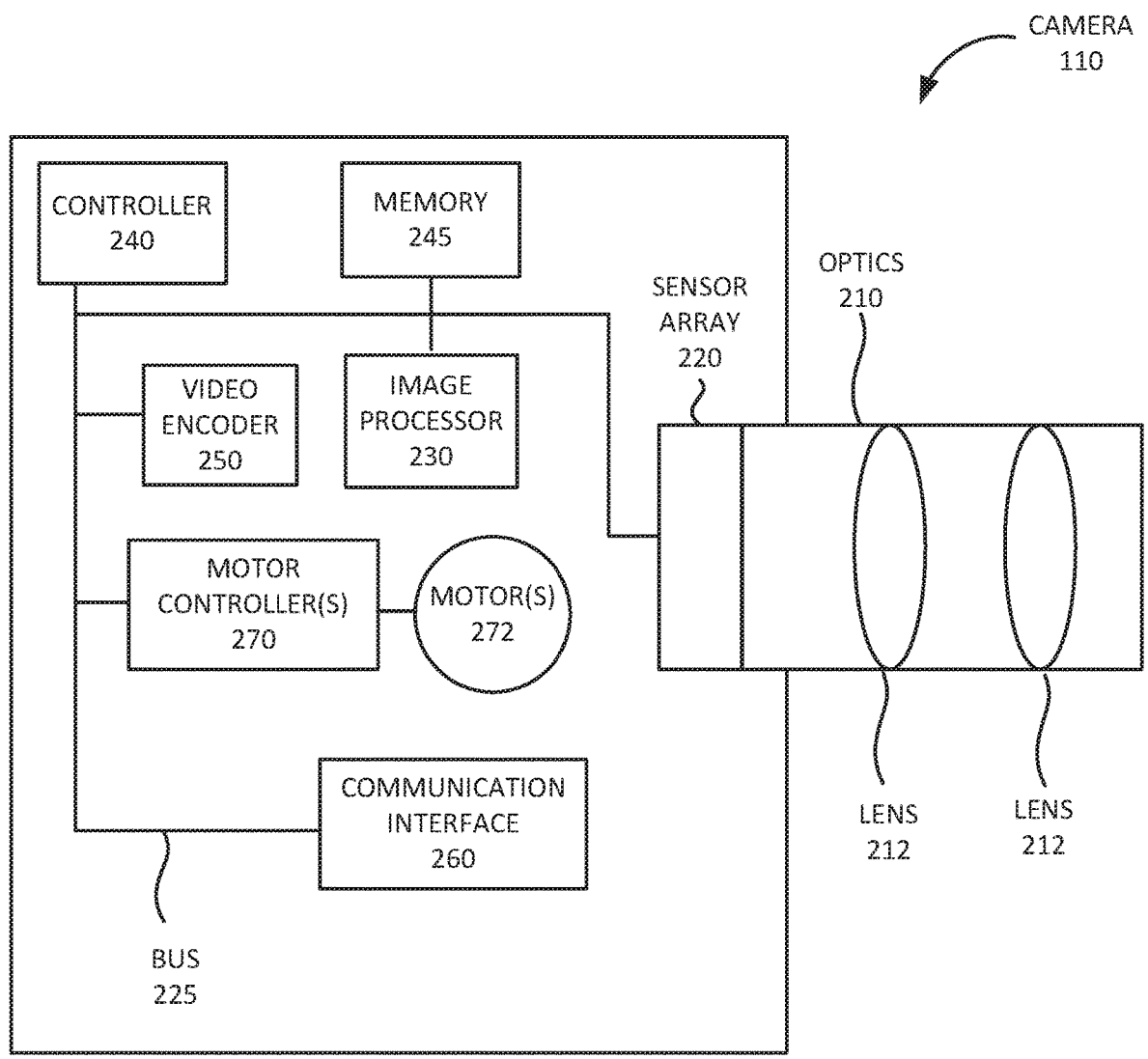
FIG. 2 is a block diagram illustrating exemplary components of the camera of FIG. 1 in one embodiment.

FIG. 2 is a block diagram illustrating exemplary components of a camera 110 in one embodiment. As shown in FIG. 2, camera 110 may include an optics chain 210, a sensor array 220, a bus 225, an image processor 230, a controller 240, a memory 245, a video encoder 250, and/or a communication interface 260. In one embodiment, camera 110 may include one or more motor controllers 270 (e.g., three) and one or more motors 272 (e.g., three) for panning, tilting, and zooming camera 110. Bus 225 is a communication path that enables components in camera 110 to communicate with each other.

Optics chain 210 includes an enclosure that directs incident radiation (e.g., light, visible light, infrared waves, millimeter waves, etc.) to a sensor array 220 to capture an image based on the incident radiation. Optics chain 210 includes lenses 212 collect and focus the incident radiation from a monitored area onto sensor array 220.

Sensor array 220 may include an array of sensors for registering, sensing, and measuring radiation (e.g., light) incident or falling onto sensor array 220. The radiation may be in the visible light wavelength range, the infrared wavelength range, or other wavelength ranges. Sensor array 220 may include, for example, a charged coupled device (CCD) array and/or an active pixel array (e.g., a complementary metal-oxide-semiconductor (CMOS) sensor array). Sensor array 220 may also include a microbolometer (e.g., when camera 110 includes a thermal camera or detector).

Sensor array 220 outputs data that is indicative of (e.g., describes properties or characteristics) the radiation (e.g., light) incident on sensor array 220. For example, the data output from sensor array 220 may include information such as the intensity of light (e.g., luminance), color, etc., incident on one or more pixels in sensor array 220. The light incident on sensor array 220 may be an "image" in that the light may be focused as a result of lenses in optics chain 210. Sensor array 220 can be considered an "image sensor" because it senses electromagnetic radiation (e.g., light) impinging ling on sensor array 220 and converts the radiation into a multidimensional signal. As the term is used herein, an "image" includes the data indicative of the radiation (e.g., describing the properties or characteristics of the light) incident on sensor array 220. Accordingly, the term "image"

may also be used to mean "image sensor data" or any data or data set describing an image. Further, a "pixel" may mean any region or area of sensor array 220 for which measurement(s) of radiation are taken (e.g., measurements that are indicative of the light incident on sensor array 220). A pixel may correspond to one or more (or less than one) sensor(s) in sensor array 220. In alternative embodiments, sensor 220 may be a linear array that may use scanning hardware (e.g., a rotating mirror) to form images, or a non-array sensor which may rely upon image processor 230 and/or controller 240 to produce image sensor data.

Video encoder 250 may encode image sensor data for transmission to other device in environment 100, such as station 125 and/or VMS 150. Video encoder 250 may use video coding techniques such as video coding standards of the ISO/MPEG or ITU-H.26X families.

Image processor 230 and/or controller 240 may perform signal processing operations on image data captured by sensor array 220. Image processor 230 and/or controller 240 may include any type of single-core or multi-core processor, microprocessor, latch-based processor, and/or processing logic (or families of processors, microprocessors, and/or processing logics) that interpret and execute instructions. Image processor 230 and/or controller 240 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Controller 240 may also determine and control the desired focus and position (e.g., tilt and zoom) of camera 110. To do so, controller 240 sends commands to one or more motor controllers 270 to drive one or more motors 272 to tilt and/or pan camera 110 or optically zoom lenses 212.

Memory 245 may include any type of volatile and/or non-volatile storage device that stores information and/or instructions. Memory 245 may include a random access memory (RAM) or any type of dynamic storage device, a read-only memory (ROM) device or any type of static storage device, a magnetic or optical recording memory device and its corresponding drive, or a removable memory device. Memory 245 may store information and instructions (e.g., applications and/or an operating system) and data (e.g., application data) for use by processor camera 110.

Memory 245 may store instructions for execution by controller 240 and/or image processor 230. The software instructions may be read into memory 245 from another computer-readable medium or from another device. The software instructions may cause controller 240 and/or image processor 230 to perform processes described herein. For example, camera 110 may perform operations relating to the image processing (e.g., encoding, transcoding, detecting objects, etc.) in response to controller 240 and/or image processor 230 executing software instructions stored in memory 245. Alternatively, hardwired circuitry (e.g., logic) may be used in place of, or in combination with, software instructions to implement processes described herein.

Communication interface 260 includes circuitry and logic circuitry that includes input and/or output ports, input and/or output systems, and/or other input and output components that facilitate the transmission of data to another device. For example, communication interface 260 may include a network interface card (e.g., Ethernet card) for wired communications or a wireless network interface (e.g., a WiFi card) for wireless communications.

Camera 110 (e.g., memory 245, image processor 230, video encoder 250, and/or controller 240) may implement a cache that acts as a buffer between an image pipeline and a streaming server that provides video streams to clients (e.g., monitoring station 125). The image pipeline runs at a steady state and pushes data into the cache. The streaming server may pull data from the cache (or buffer) independently for each client. In one embodiment, the streaming server may pull data from the cache at a rate faster than real-time, at real-time, slower than real-time for eventual transmission to a client.

Although FIG. 2 shows exemplary components of camera 110, in other implementations, camera 110 may include fewer components, different components, differently arranged components, or additional components than depicted in FIG. 2. Additionally or alternatively, one or more components of camera 110 may perform functions described as performed by one or more other components of camera 110. For example, controller 240 may perform functions described as performed by image processor 230 and vice versa. Alternatively or additionally, camera 110 may include a computing module as described below with respect to FIG. 3.

Figure 3:
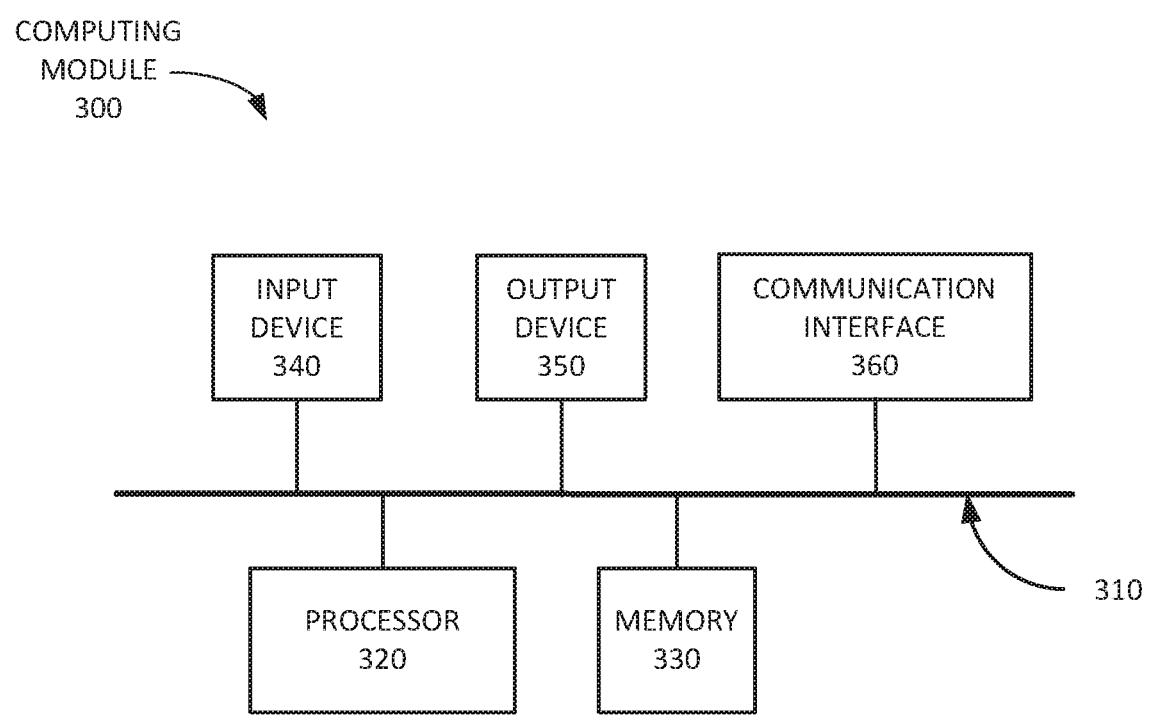
FIG. 3 is a block diagram illustrating exemplary components of a computing module in one embodiment.

FIG. 3 is a block diagram illustrating exemplary components of a computing module 300 in one embodiment. Devices in environment 100 (e.g., VMS 150, displays 130, motion detector 111, smoke detector 112, and/or sensor 113) may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logic) that interprets and executes instructions. Processor 320 may include an ASIC, an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of volatile and/or non-volatile storage device that stores information and/or instructions. Memory 330 may include a RAM or any type of dynamic storage device, a ROM or any type of static storage device, a magnetic or optical recording memory device and its corresponding drive, or a removable memory device. Memory 330 may store information and instructions (e.g., applications and an operating system) and data (e.g., application data) for use by processor 320.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system may include software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, etc.), wired communications, or a combination thereof. Communication interface 360 may include a transceiver that converts baseband signals to radio frequency (RF) signals or vice versa and may be coupled to an antenna.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications or a wireless network interface (e.g., a WiFi) card for wireless communications.

Some devices may also include input device 340 and output device 350. Input device 340 may enable a user to input information into computing module 300. Input device 370 may include a keyboard, a mouse, a pen, a microphone, a camera, a touch-screen display, etc.

Output device 350 may output information to the user. Output device 350 may include a display, a printer, a speaker, etc. Input device 340 and output device 350 may enable a user interact with applications executed by computing module 300. In the case of a "headless" device (such as a deployed remote camera), input and output is primarily through communication interface 360 rather than input device 340 and output device 350.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
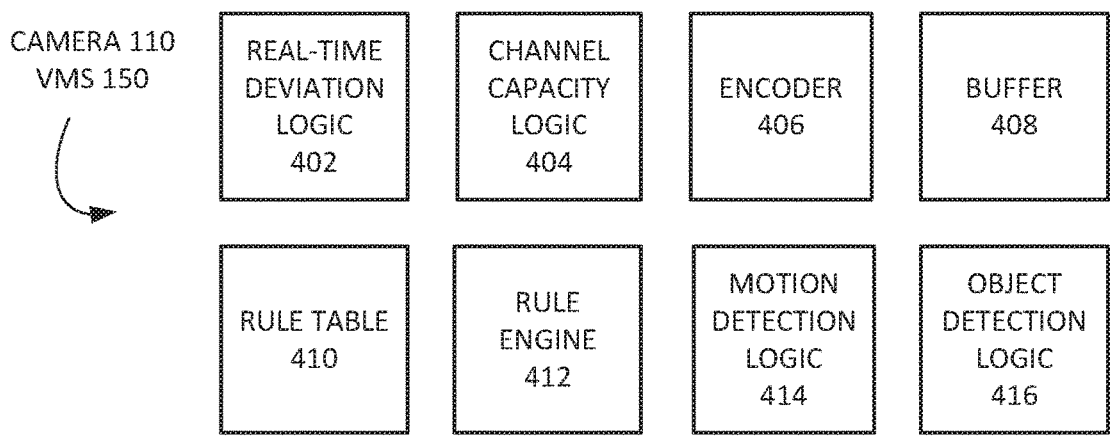
FIG. 4 is a block diagram of exemplary functional components of the camera and/or video monitoring system of FIG. 1 in one embodiment.

FIG. 4 is a block diagram of exemplary functional components of camera 110 and/or VMS 150 in one embodiment. Camera 110 and/or VMS 150 may include real-time deviation logic 402, channel capacity detector 404, encoder 406, buffer 408, rule table 410, rule engine 412, motion detection logic 414, and/or object detection logic 416.

Real-time deviation logic 402 determines when camera 110 and/or VMS 150 may deviate from transmitting a video stream at the video stream bitrate (e.g., the real-time bitrate or speed). For example, if one or more qualifying conditions are met (e.g., motion in the video stream, door opening, etc.), then real-time deviation logic 402 may determine to increase the bitrate of the video (or allow for or enable the increase of the bitrate of the video), and buffer the video to the extent that the video stream cannot be transmitted at the video stream bitrate, and transmit the video stream to monitoring station 125 over a longer period of time (a time stretch) for viewing by an operator on display 130 (e.g., in slow motion).

Channel capacity detector 404 determines the capacity (e.g., the maximum transmission speed in bits per second) of a channel between camera 110 and monitoring station 125. Many different methods may be used to determine the channel capacity. Channel capacity logic 404 may determine the channel capacity by transmitting data through network 120 at increasing speeds to determine the transmission speed at which packets are dropped. When packets begin to drop, the channel capacity has been surpassed. The data passed through network 120 to measure its capacity may include the video stream. That is, when packets in the video stream start to drop, the capacity of network 120 has been reached. In one embodiment, the channel capacity may be measured or determined on a continuous basis. In one embodiment, the channel capacity may be assigned to camera 110 or a particular video stream (e.g., without regard to the actual capacity of network 120). For example, during configuration, each camera 110 in environment 100 may be provided with a channel capacity that each camera 110 should not exceed. In another embodiment, the channel capacity may be a dynamic threshold set by camera 110 (e.g., by encoder 406). For example, if encoder 406 employs a variable bitrate (VBR) encoder, the channel capacity may be the maximum bitrate assigned to the VBR encoder. If encoder 406 employs a constant bitrate (CBR) encoder, the channel capacity may be the constant bitrate assigned to the CBR encoder. As described herein, during an event, encoder 406 may be enabled to provide a bitrate that is higher than the channel capacity, which may include enabling encoder 406 to generate a stream with a bitrate higher than its assigned maximum bitrate (for a VBR encoder) or higher than its assigned constant bitrate (for a CBR encoder) (e.g., during the event). The channel capacity could also be an arbitrary bitrate threshold that the video stream has to comply with any other reason.

Encoder 406 inputs image and/or video information and encodes it into a video stream for transmitting through network 120 to monitoring station 125. Encoder 406 may use a variable-bitrate encoding method. Encoder 406 may increase the bitrate depending on motion in the video. For example, if camera 110 is capturing video of a scene of a door and a person enters the scene, then encoder 406 may increase the bitrate in order to encode the additional information regarding the person entering the scene. Encoder 406 may increase the bitrate (e.g., as a result of encoding motion) without necessarily changing the quality of the video Additional factors may cause encoder 406 to increase the bitrate of the video stream. Encoder 406 may adjust the quality of the video by changing a "quality factor" of the video stream. The quality factor may include a quantization parameter (for discrete cosine transform (DCT) coefficients), image resolution, framerate, dynamic color range, no color (e.g., black and white), etc. Increased quality and/or additional information (such as motion) may result in a higher bitrate. Encoder 406 may encode the video stream at different bitrates depending on the capacity of network 120. That is, a higher channel capacity through network 120 may enable a higher bitrate and higher quality video. On the other hand, a lower channel capacity through network 120 may reduce the quality and bitrate of the video (e.g., to avoid lost packets during transmission).

Buffer 408 may store the video stream before transmission when the video stream bitrate is higher than the transmission rate of the video stream through network 120. The video stream bitrate may be higher than the transmission rate, for example, during an event that may require more information to be encoded (such as a motion event). Memory 330 and/or memory 245 may include buffer 408. In one embodiment, buffer 408 is an application-layer buffer (e.g., as opposed to a network-layer buffer). In this embodiment, buffer 408 is an application-layer buffer that is separate from the transmission control protocol (TCP) buffer (which may be in the kernel of the operating system). In addition, buffer 408 may be used in user datagram protocol (UDP), which may not be associated with a buffer in the kernel. In the application layer, buffer 408 may be closer to the capture of image data, rather than in the kernel or network (e.g., in network devices). In one embodiment, buffer 408 may be between the image pipeline and the streaming server.

Rule table 410 stores actions for rule engine 412 to take when the conditions of a rule are met. Rule engine 412 receives event notifications (e.g., from a sensor), interprets rules stored in rule table 410, and performs actions when the conditions of the rules are met. For example, if motion is detected by motion detection logic 414, rule engine 412 may instruct encoder 406 to allow a higher bitrate in the video stream, accept a real-time deviation mode, and/or increase the quality (which may increase the bitrate) of the video stream being transmitted to monitoring station 125 and displayed on display 130. As another example, if a sensor determines that a door has opened, rule engine 412 may instruct encoder 406 to allow a higher bitrate of the video stream (e.g., with or without changing a quality factor), accept a real-time deviation mode, and/or increase the quality (which may increase the bitrate) of the video stream being transmitted to monitoring station 125 and displayed on display 130.

Motion detection logic 414 detects motion events and sends notifications of motion events to other devices and/or rule engine 412. For example, motion detection logic 414 in camera 110 may compare one image to the next to detect motion. If motion is detected (e.g., an event), motion detection logic 414 may send an event notification to another device rule engine 412. In one embodiment, motion detection logic 414 may determine a motion event by determining that the bitrate of the video stream has increased.

Object detection logic 416 may detect an object in the video stream. When a particular object is detected (e.g., an event), object detection logic 416 may send an event notification to another device or to rule engine 412. The event may include movement of the object, the object entering a field of view of the camera, an object leaving the field of view of the camera, recognizing that the object belongs to a particular class of physical objects, or recognizing that the object is a face of a particular person.

Figure 5:
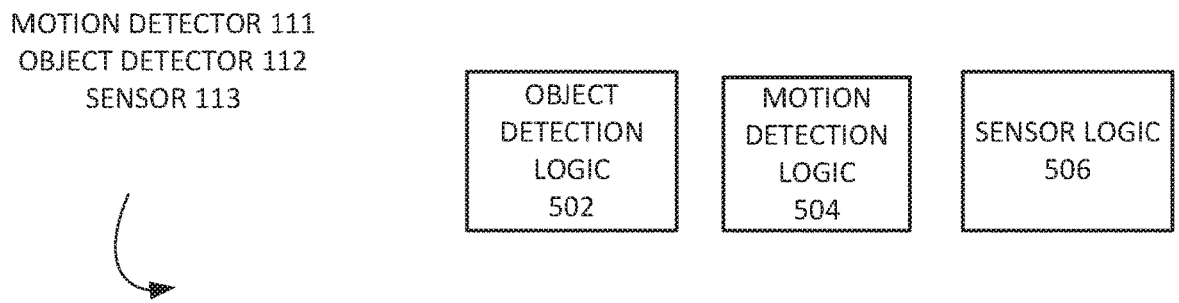
FIG. 5 is a block diagram of exemplary functional components of motion detector, face detector, and/or sensor of FIG. 1 in one embodiment.

FIG. 5 is a block diagram of exemplary functional components of motion detector 111, object detector 112, and/or sensor 113 in one embodiment. These devices may include object detection logic 502, motion detection logic 504, and/or sensor logic 506.

Object detection logic 502 may operate similar to object detection logic 416, but may be separate from camera 110. Like object detection logic 416, object detection logic 502 may detect an object and/or a face in the video stream. When a particular object or face is detected (e.g., an event), object detection logic 502 may send an event notification to another device or to rule engine 412 and rule engine 412 may instruct encoder 406 to allow a higher bitrate of the video stream (e.g., with or without changing a quality factor), accept a real-time deviation mode, and/or increase the quality of the video stream being transmitted to monitoring station 125 and displayed on display 130.

Motion detection logic 504 may operate like motion detection logic 414, but may be separate from camera 110. Motion detection logic 504 detects motion events and sends notifications of motion events to other devices and/or rule engine 412. For example, if motion is detected (e.g., an event), motion detection logic 504 may send an event notification to another device rule engine 412 and rule engine 412 may instruct encoder 406 to allow a higher bitrate of the video stream (e.g., without or without a change in a quality factor), accept a real-time deviation mode, and/or increase the quality of the video stream being transmitted to monitoring station 125 and displayed on display 130.

Sensor logic 506 includes any type of sensor that can create an event. For example, if sensor logic 506 determines that a door has opened, sensor logic 506 may send an event message to rule engine 412 and rule engine 412 may instruct encoder 406 to allow a higher bitrate of the video stream, accept a real-time deviation mode, and/or increase the quality of the video stream being transmitted to monitoring station 125 and displayed on display 130.

Figure 6:
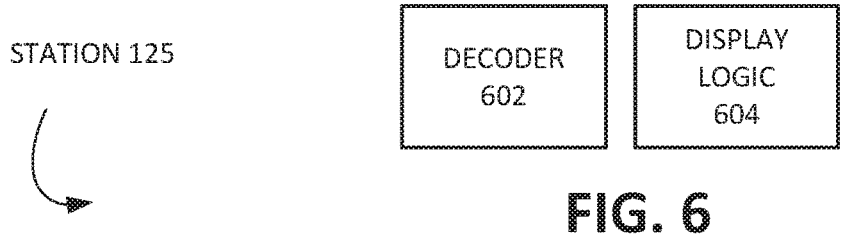
FIG. 6 is a block diagram of exemplary functional components of the monitoring station of FIG. 1 in one embodiment.

FIG. 6 is a block diagram of exemplary functional components of monitoring station 125 in one embodiment. Monitoring station 125 may include decoder 602 and display logic 604. Decoder 602 decodes video streams received through network 120 and displays video on display 130. Display logic 604 informs the operator of when, for example, video is being displayed in slow motion or fast motion. In one embodiment, display logic 604 may also send a signal back to camera 110 and/or VMS 150 requesting a stop to the real-time deviation.

Figure 7:
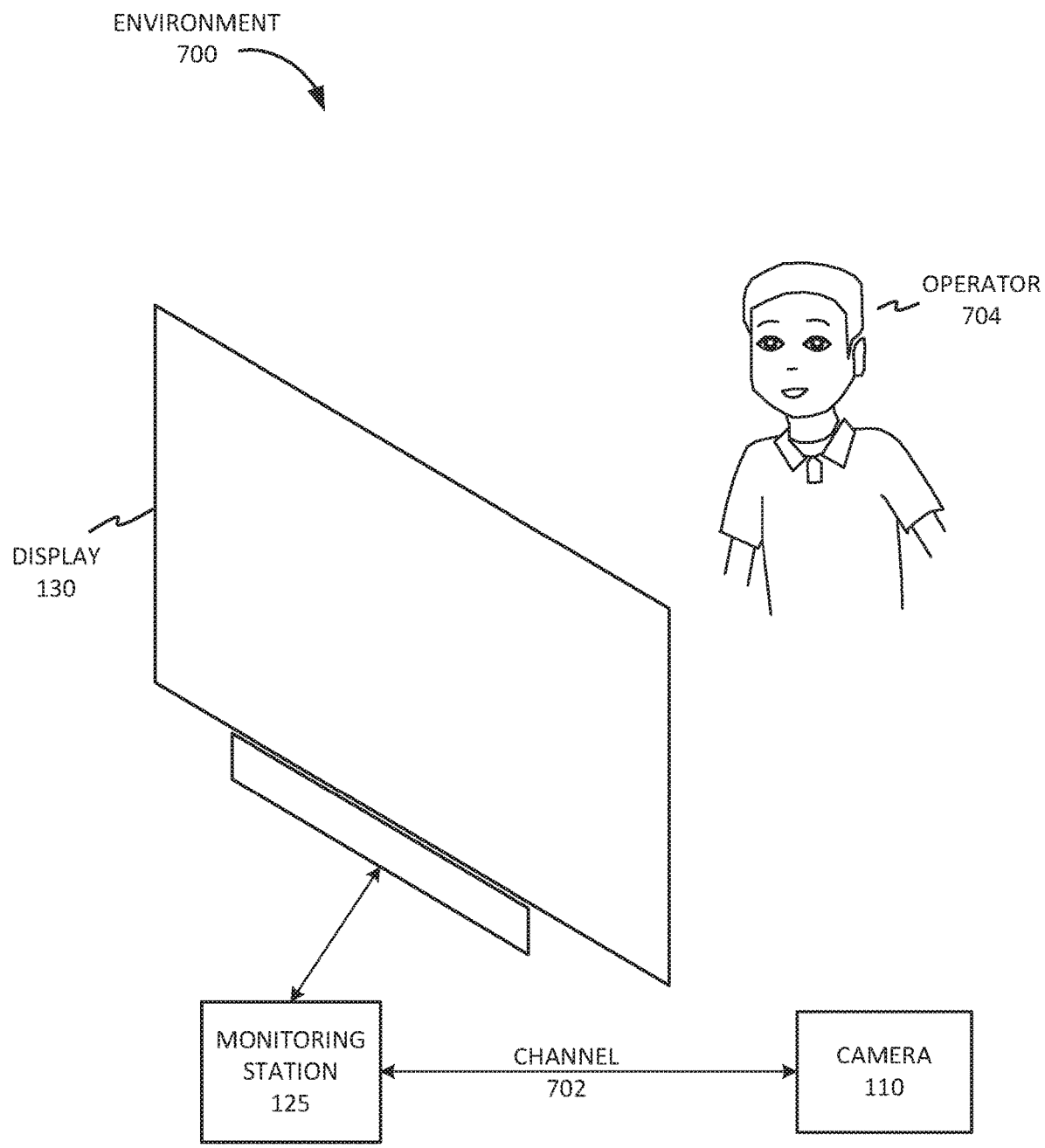
FIG. 7 is a block diagram of a simplified monitoring system environment.

FIG. 7 is a block diagram of a simplified monitoring system environment 700. Environment 700 includes camera 110 for capturing images of area 106 and encoding the images into a video stream for transmission over a network channel 702. Although channel 702 is shown as a single line, channel 702 may include a network (e.g., network 120). Thus, channel 702 may be shared by numerous devices and may have many segments, each segment shared by different devices. Environment 700 also includes monitoring station 125 with display 130 for showing the video stream on display 130 to operator 704. Environment 700 is simplified. Additional or a different arrangement of components is possible, including the use of VMS 150 for encoding and/or transcoding the videostream for transmission over channel 702.

A video stream has a "bitrate" or a "video stream bitrate". The video stream bitrate corresponds to the number of bits in the video stream per unit of time in the captured scene. Thus, if a video stream uses 1 megabit (Mb) to encode 1 second of video, then the bitrate for the video stream is 1 megabits per second (Mbps). A video stream is transmitted into channel 702 at a "transmission speed" which may also be measured in bits per second. Thus, if a transmitter transmits 1 Mb of data in 1 second, then the transmission speed is 1 Mbps. If the transmission speed of a video stream matches the video stream bitrate, then the transmission speed is considered to be a "real-time transmission speed". The rate that the video stream is received (e.g., by a decoder) is generally the same as the transmission speed (assuming that packets are not lost). The term "rate" is considered to be synonymous with "speed".

The transmission speed may be limited by the capacity of channel 702 (the "channel capacity"). Because channel 702 is generally a network 120 with many segments shared by other devices (such as other cameras 110), the channel capacity may change with time (e.g., as other devices come on and offline or if another device temporarily needs a higher bitrate). The channel capacity may also be expressed in bits per second. If the transmission rate is higher than the channel capacity, then packets may be dropped in the network and data may be lost.

If the video stream bitrate is higher than the channel capacity, a system may (1) attempt to transmit the video stream at a transmission rate that is higher than the channel capacity. In this case, network 120 may drop packets and the decoder may present incomplete video. Alternatively, if the video stream bitrate is higher than the channel capacity, the system may (2) transmit at a rate that is lower than the video stream bitrate. In this case, the transmission speed is lower than the real-time speed, and the decoder may present video that starts and stops abruptly because the decoder receives the video stream at a rate lower than the real-time rate. As another alternative, if the video stream bitrate is higher than the channel capacity, the system may (2) encode, transcode, and/or re-encode the video to lower the video stream bitrate to match the channel capacity. In this case, the quality of the video presented to operator 704 may be lower.

Operator 704 generally has two criteria with respect to viewing video that is happening in area 106. First, operator 704 wants to view video that is as high-quality as possible. Second, operator 704 wants to view what is happening in "real time" or "as it happens" with the understanding that there is a transmission delay (in channel 702) and potential encoding and decoding delays. The ability for VMS 150 and/or camera 110 to meet these two criteria depends on the capacity of channel 702. Higher quality video generally means a higher video stream bitrate. Thus, camera 110 and/or VMS 150 increases the video quality until the video stream bitrate corresponds to the channel capacity (e.g., the video stream bitrate is the same or lower than the channel capacity). Increasing the video quality any higher would mean that packets would be lost or delayed resulting in poor video quality being presented to operator 704.

A problem may arise in a system because the video stream bitrate may vary (particularly when the encoder uses a variable bitrate algorithm). For example, if a person enters area 106 (an "event"), the video stream bitrate may temporarily increase because of the additional information (including motion) needs to be encoded. To prevent the video stream bitrate from increasing above the channel capacity, the system may encode the video to decrease the quality of the video at precisely the time when operator 704 may wish not to reduce the quality of the video (but may wish to maintain and/or increase the quality). Disclosed herein is a method that may enable the system to maintain video quality in a monitoring system in such a circumstance (e.g., during events).

Figure 8A:
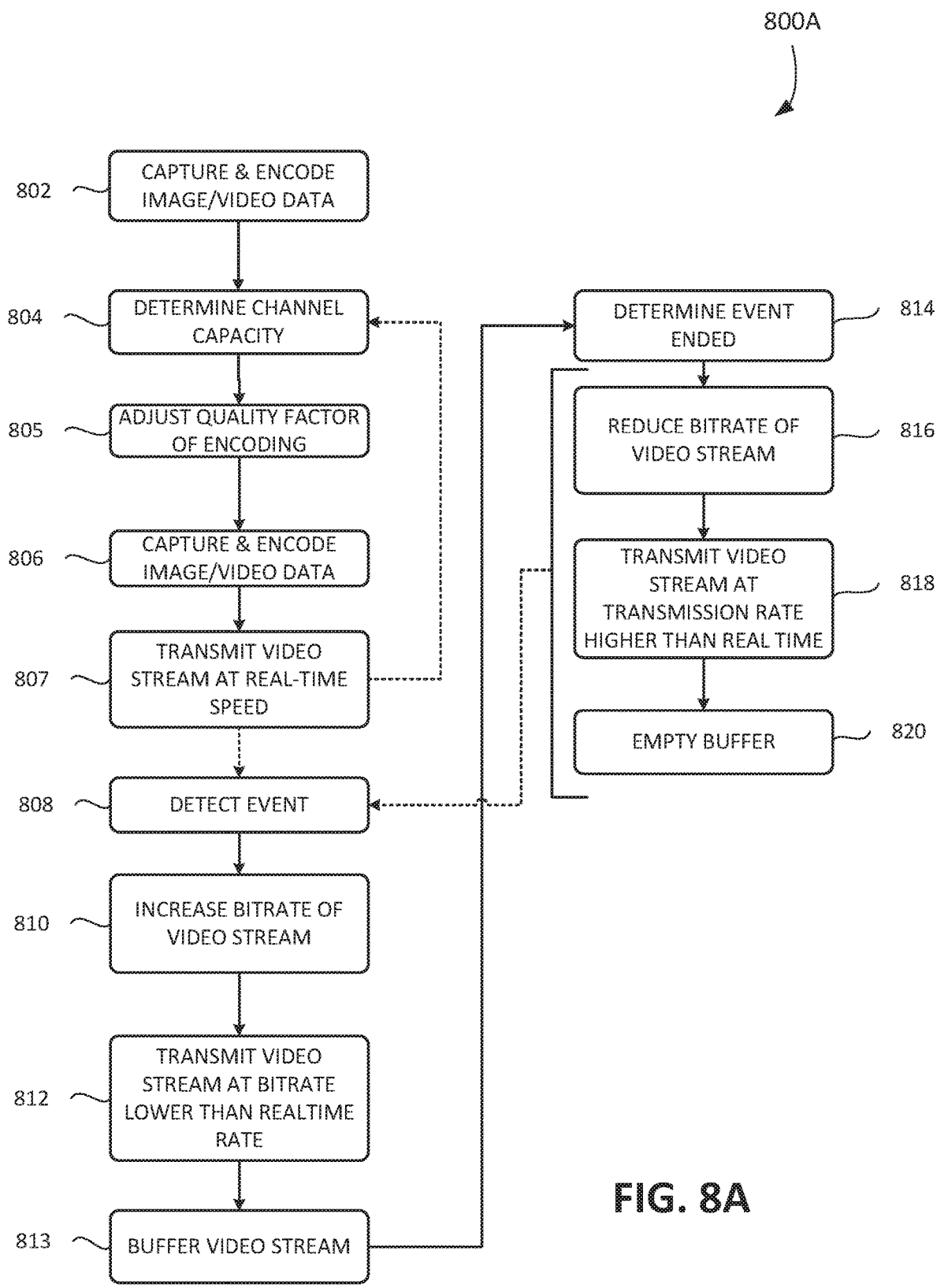
FIGS. 8A and 8B are flowcharts of processes for real-time deviation in a video monitoring system in one embodiment.
Figure 8B:
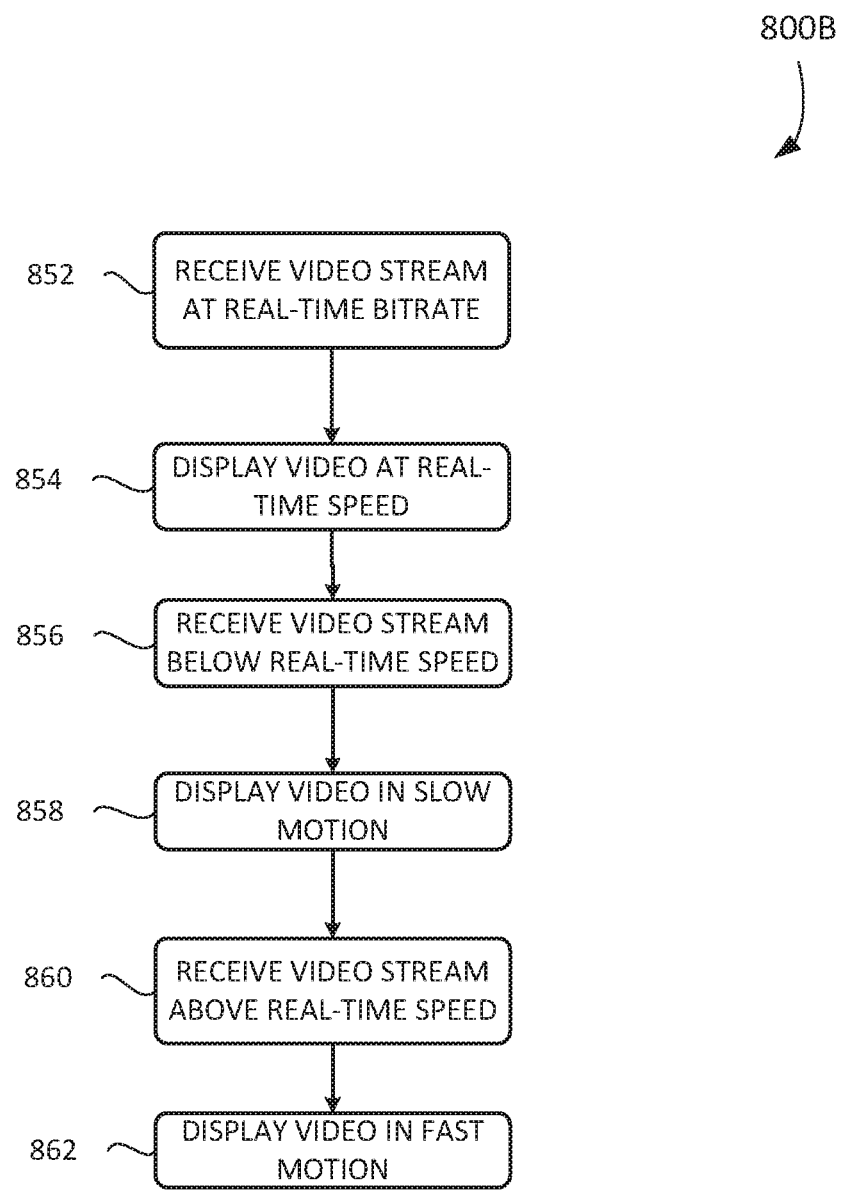
Figure 9A:
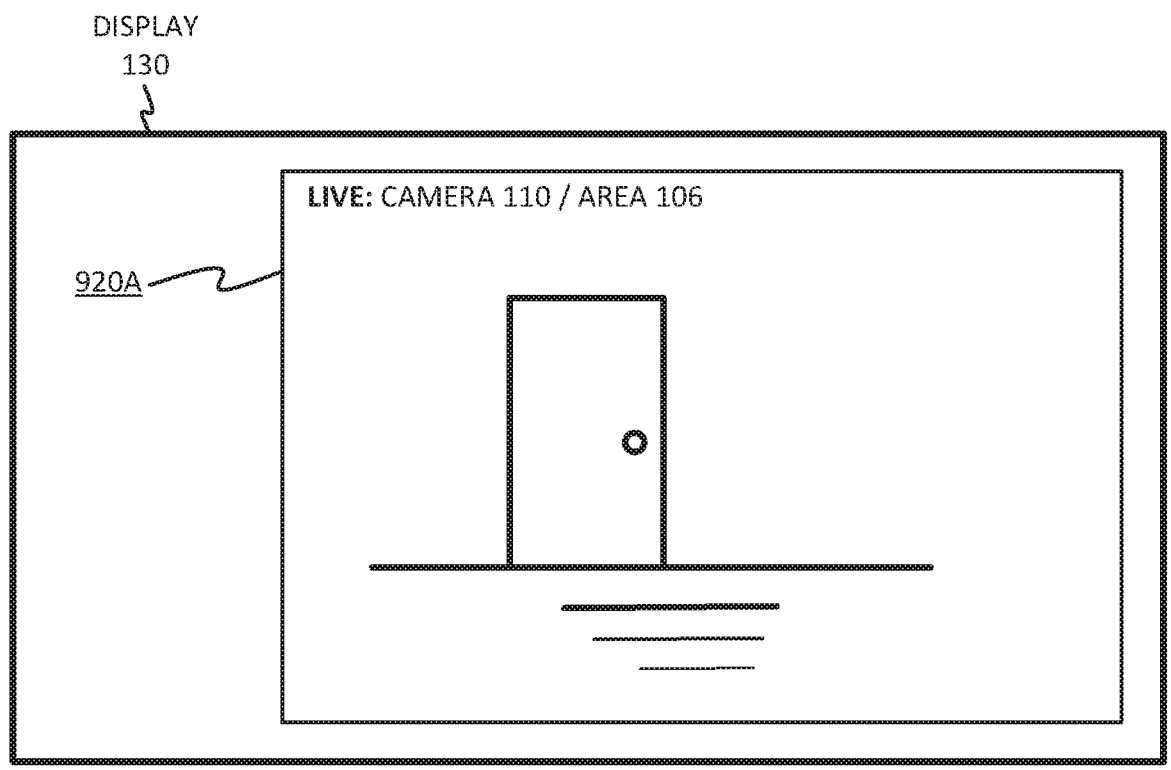
FIGS. 9A, 9B, and 9C illustrate what an operator may see on a display before, during, and after an event in one embodiment.
Figure 9B:
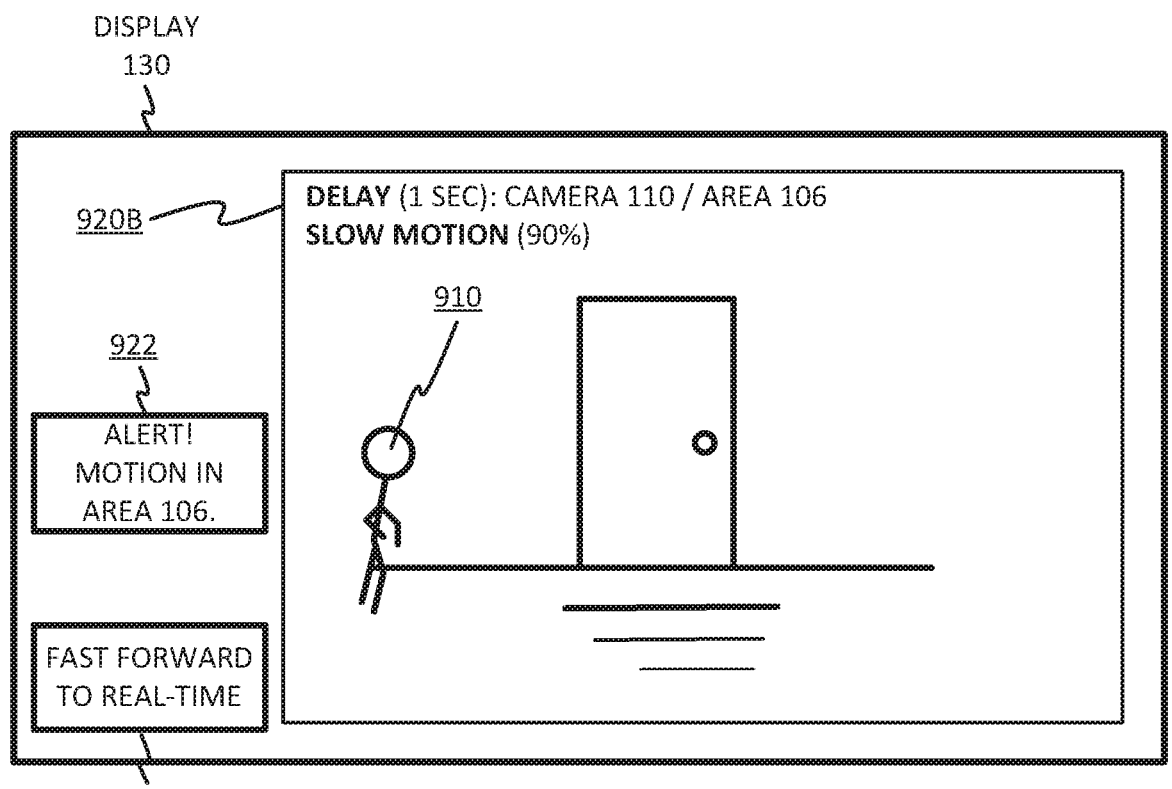
Figure 9C:
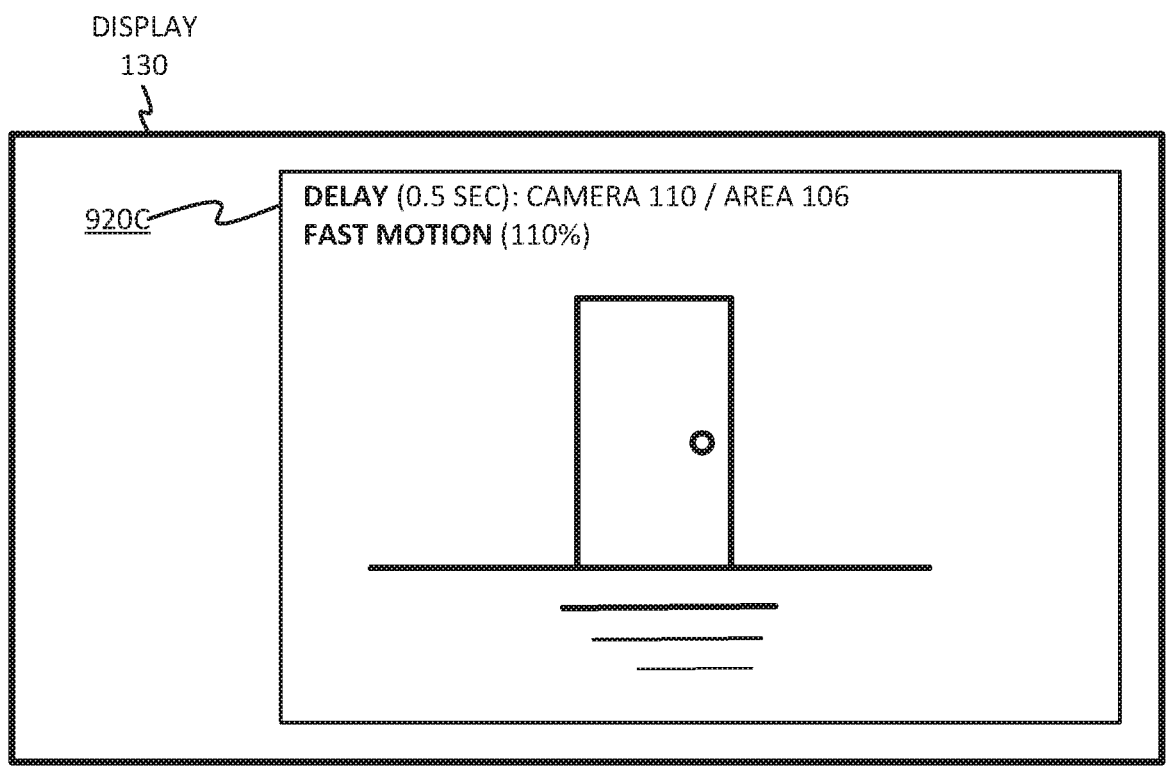
Figure 10:
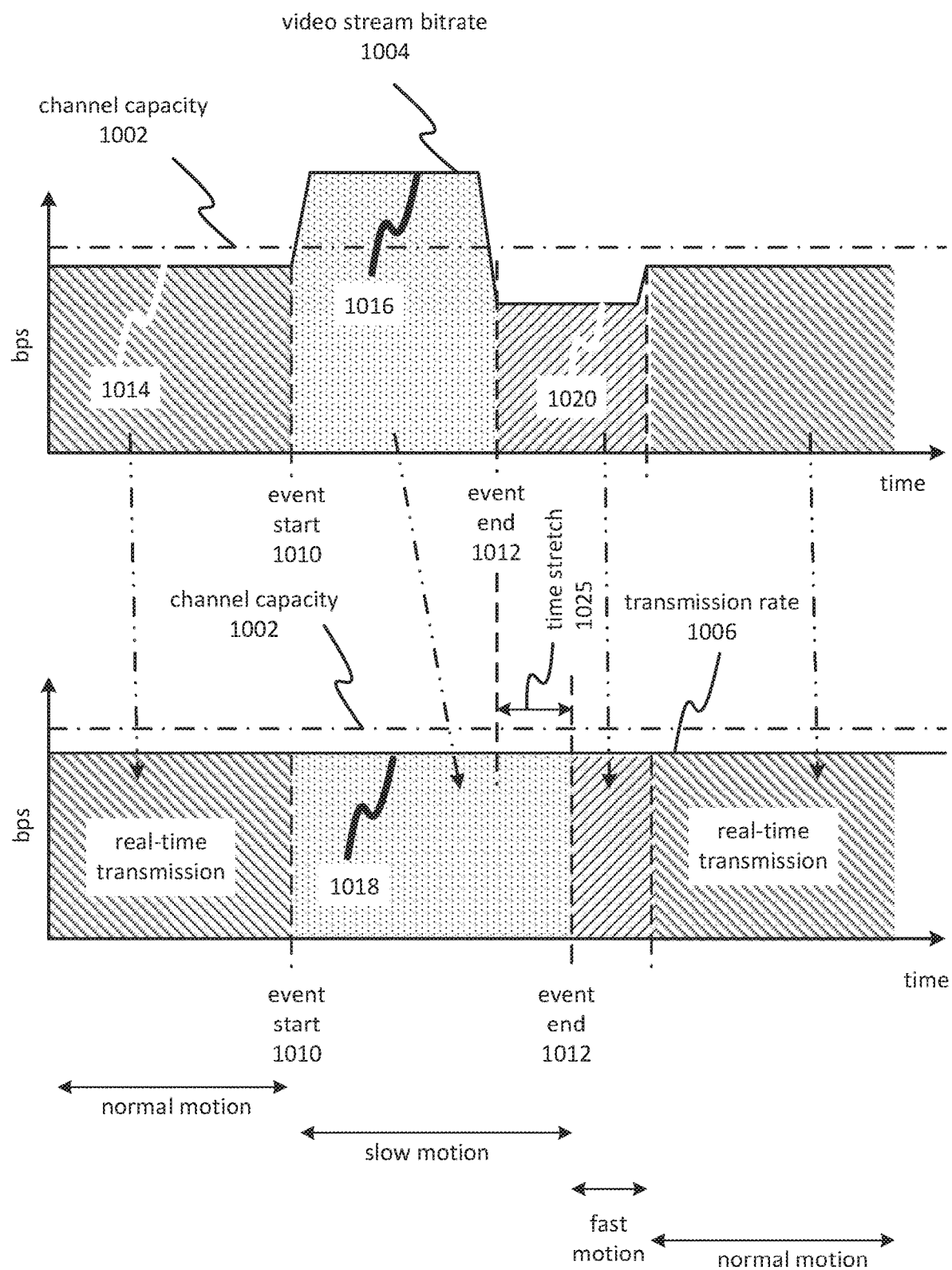
FIG. 10 illustrates bit rates before, during and after an event in one embodiment.

FIGS. 8A and 8B are flowcharts of processes for real-time deviation in a video monitoring system in one embodiment. Process 800A relates to capturing, encoding, and transmitting a video stream. Process 800B relates to receiving and displaying the video stream. Process 800A and 800B (collectively process 800) can be run in or by camera 110 and/or VMS 150, monitoring station 125 and/or display 130. Process 800A may be run in the devices by a processor (e.g., processor 230, encoder 250, controller 240, and/or processor 320) executing instructions stored in memory (e.g., memory 245 and/or memory 330). Process 800A is described in conjunction with FIG. 7, FIGS. 9A-9C, and FIG. 10. FIGS. 9A, 9B, and 9C illustrate what operator 704 may see on display 130 before, during, and after an event, respectively, in one embodiment. FIG. 10 illustrates bit rates before, during and after an event in one embodiment.

Process 800A begins with the capture and encoding of image and/or video data (block 802). In this example, camera 110 captures images of area 106. In a monitoring system, camera 110 captures "live" images of area 106 (e.g., a live scene or a live event). To aid in the determination of the quality of the video stream, the channel capacity (e.g., maximum transmission speed without packet loss) may be determined (block 804). Many different techniques may be used to determine the channel capacity. For example, channel capacity logic 404 may determine the channel capacity by transmitting data through channel 702 at increasing speeds to determine the transmission speed at which packets are dropped. When packets begin to drop, the channel capacity has been surpassed. The data passed through channel 702 to measure its capacity may include the video stream. That is, when packets in the video stream start to drop, the capacity of channel 702 has been reached. In one embodiment, the channel capacity may be measured or determined on a continuous basis. FIG. 10 shows channel capacity 1002 as a dashed-dotted line. In one embodiment, the channel capacity is determined when no event is occurring (e.g., before an event). In other embodiments, channel capacity logic 404 may assign the channel capacity (block 804) to camera 110 or a particular video stream (e.g., without regard to the actual capacity of network 120). For example, during configuration, each camera 110 in environment 100 may be provided with a channel capacity that each camera 110 should not exceed. In another embodiment, the channel capacity may be a dynamic threshold set by camera 110 (e.g., by channel capacity logic 404 and/or encoder 406). For example, if encoder 406 employs a variable bitrate (VBR) encoder, the channel capacity may be the maximum bitrate assigned to the VBR encoder. If encoder 406 employs a constant bitrate (CBR) encoder, the channel capacity may be the constant bitrate assigned to the CBR encoder.

A quality factor of the video stream may be adjusted (block 805) based on the channel capacity. For example, the resolution of images may be increased (and the video stream bitrate increased) if channel 702 can carry additional data. As another example, a quantization parameter of DCT coefficients may be changed to allow for a larger number of levels (and the video stream bitrate increased) if channel 702 can carry additional data. On the other hand, the resolution of images may be decreased (and the video stream bitrate decreased) if channel 702 is dropping packets. Alternatively, the quantization parameter of DCT coefficients may be changed to reduce the number of levels (and the video stream bitrate decreased) if channel 702 is dropping packets. With the quality factor determined, process 800A may continue with capturing and encoding image and video data (block 806) and transmitting the video stream (at real-time speed) through channel 702 (block 807). This process (e.g., blocks 804 through 807) may continue as video is captured and transmitted. Process 800B (See FIG. 8B) may begin by receiving the video stream (block 852) at real-time speed from channel 702 and displaying the video at real-time speed (block 854).

FIG. 10 shows a graph of the video stream bitrate 1004 (top) and the transmission rate 1006 (bottom) before, during, and after an event. In this example, before event start time 1010, the video stream bitrate (section 1014) closely tracks the channel capacity 1002. During this time, because the video stream bitrate is less than the channel capacity, the video stream is transmitted at its real-time speed (block 807) (see FIG. 10 bottom). Monitoring station 125 receives (block 852) the video stream (at a real-time rate) and displays (block 854) the video stream on display 130 as shown in FIG. 9A. FIG. 9A shows display 130 with a window 920A indicating that area 106 (from camera 110) is being shown "live". The video in window 920A is may also be displayed (block 854) at normal motion speed (e.g., not slow motion or fast motion). This situation may continue until event start time 1010.

Process 800A (e.g., blocks 804 to 807) may be interrupted if an event is detected (block 808). An event of interest may include motion, object detection, and/or facial detection, for example, by motion detection logic 414 or 502, object detection logic 416 or 504, and/or sensor logic 506. Detecting an event may include determining that the bitrate of the video stream has increased, such as an increase caused by motion in images of the video. During an event, it may be desirable to increase the bitrate of the video stream (e.g., resulting from motion) (block 810). For example, as shown in FIG. 9B, a person 910 has entered area 106, which corresponds to an event at event start time 1010. As shown in FIG. 10, the video stream bitrate 1004 increases to a rate that is higher than channel capacity 1002 (segment 1016). In one embodiment noted above, during an event, encoder 406 may be enabled to provide a bitrate that is higher than the channel capacity, which may include enabling encoder 406 to generate a stream with a bitrate higher than its assigned maximum bitrate (for a VBR encoder) or higher than its assigned constant bitrate (for a CBR encoder) (e.g., during the event).

Because the video stream bitrate is higher than the channel capacity, transmitting the video stream at the real-time rate may result in lost packets. Accordingly, the video stream may be transmitted at a bitrate that is lower than the real-time bitrate (block 812). Because the video stream is transmitted at a rate lower than the real-time rate, it takes more time (than the corresponding video record time) to transmit the video stream. As shown in FIG. 10, the time segment 1016 during the event is stretched during transmission (to corresponding segment 1018). During this time, the video stream may be buffered (block 813) to avoid the loss of packets during the event. Transmitting the video stream at a rate lower than the real-time transmission rate introduces a time stretch 1025. Real-time deviation logic 402 may use buffer 408 to buffer the video stream. Because buffer is an application-layer buffer (rather than a network-layer buffer), packets will not be dropped when the video stream bitrate is higher than the channel capacity. In one embodiment, the transmitted video stream may include information indicating to decoder 602 that the video stream is being time stretched. In another embodiment, decoder 602 may infer the time stretch without additional information being added to the video stream.

Process 800B continues with receiving the video stream below the real-time speed (block 856) and displaying the video in slow motion (block 858). Monitoring station 125 receives the video stream at a rate that is lower than the real-time transmission rate. Rather than displaying video that abruptly starts and stops, monitoring station 125 displays the video in slow motion. As shown in FIG. 9B, window 920B on display 130 indicates to operator 704 that the video is being shown in slow motion (e.g, at 90% of real-time speed) and that the scene being shown has been cumulatively delayed by an additional 1 second (e.g., to provide for the higher bitrate). The slow motion at the higher bitrate may continue until the end of the event. In one embodiment, operator 704 may end the event (e.g., fast forward, skip forward, and/or return to normal speed) by selecting button 924 marked with "fast forward to real-time" in FIG. 9B. In one embodiment, receiving the video stream at a rate that is lower than the real-time speed causes the displaying of the video in slow motion (e.g., causes decoder 602). In another embodiment, the video stream may include information (e.g., added by encoder 406) that is interpreted at monitoring station 125 that causes decoder 602 to display the video in slow motion.

When the end of the event is detected or determined (block 814), the bitrate of the video stream may be reduced (block 816). The end of an event may include lack of motion, no object detected, and/or no facial recognition, for example, by motion detection logic 414 or 502, object detection logic 416 or 504, and/or sensor logic 506. For example, person 910 may have left the scene as shown in FIG. 9C, which corresponds to after event end time 1012. Determining that an event has ended may also include determining that the bitrate of the video stream has decreased, such as a decrease caused by lack of motion in images of the video. As shown in FIG. 10, the video stream bitrate is reduced to an extent that there is additional channel capacity (e.g., the difference between video stream bitrate 1004 and the channel capacity 1002 during segment 1020). When the transmitter transmits this portion of the video stream (e.g., section 1020), the video stream may be transmitted at a transmission rate higher than the real-time transmission rate (block 818) until the buffer may be emptied (block 820). Transmitting at a rate higher than the real-time transmission rate compensates for time stretch 1025 introduced earlier during the event. In one embodiment, the transmitted video stream may include information indicating to decoder 602 that the video stream is being transmitted to compensate for time stretched 1025. In another embodiment, decoder 602 may infer this without additional information being added to the video stream.

Process 800B continues with receiving the video stream above the real-time speed (block 860) and displaying the video in fast motion (block 862). Monitoring station 125 receives the video stream at a rate that is higher than the real-time rate. Rather than displaying video at a real-time rate, monitoring station 125 displays the video in fast motion. As shown in FIG. 9C, window 920C on display 130 indicates to operator 704 that the video is being shown in fast motion (e.g, at 110% of real-time speed) and that the scene being shown has been cumulatively delayed by an additional 0.5 seconds (e.g., to provide for the higher bitrate). The fast motion at the lower bitrate may continue until the buffer is emptied (block 820) and/or monitoring station 125 begins to receive the video stream at a transmission rate that corresponds to the real-time rate.

After the buffer is emptied, process 800A may start again with the video stream bitrate corresponding to a real-time transmission rate. After determining that the event is over (block 814) and before the buffer is empty (block 820), another event may be detected (block 808) and blocks 810-813 may be repeated (e.g., increasing the bitrate of the video stream (block 810), transmitting the video stream at a bitrate lower than real-time rate (block 812), buffering the video stream (block 813), and playing the video in slow motion (block 858)).

As shown in FIG. 10, the transmitted video stream has a first bitrate before the event (segment 1014) and a second bitrate during the event (segment 1016). In one embodiment, the second bitrate is higher than the first bitrate. The transmitted video stream has a third bitrate after the event (segment 1020). The third bitrate corresponds to the reduced bitrate, and in one embodiment the third bitrate is lower than the first bitrate. Reducing the bitrate of the video stream may include reducing a quality factor of the video stream. Reducing the quality factor of the video stream may include reducing a framerate, a quantization parameter, and/or a resolution of images in the video stream.

Figure 11:
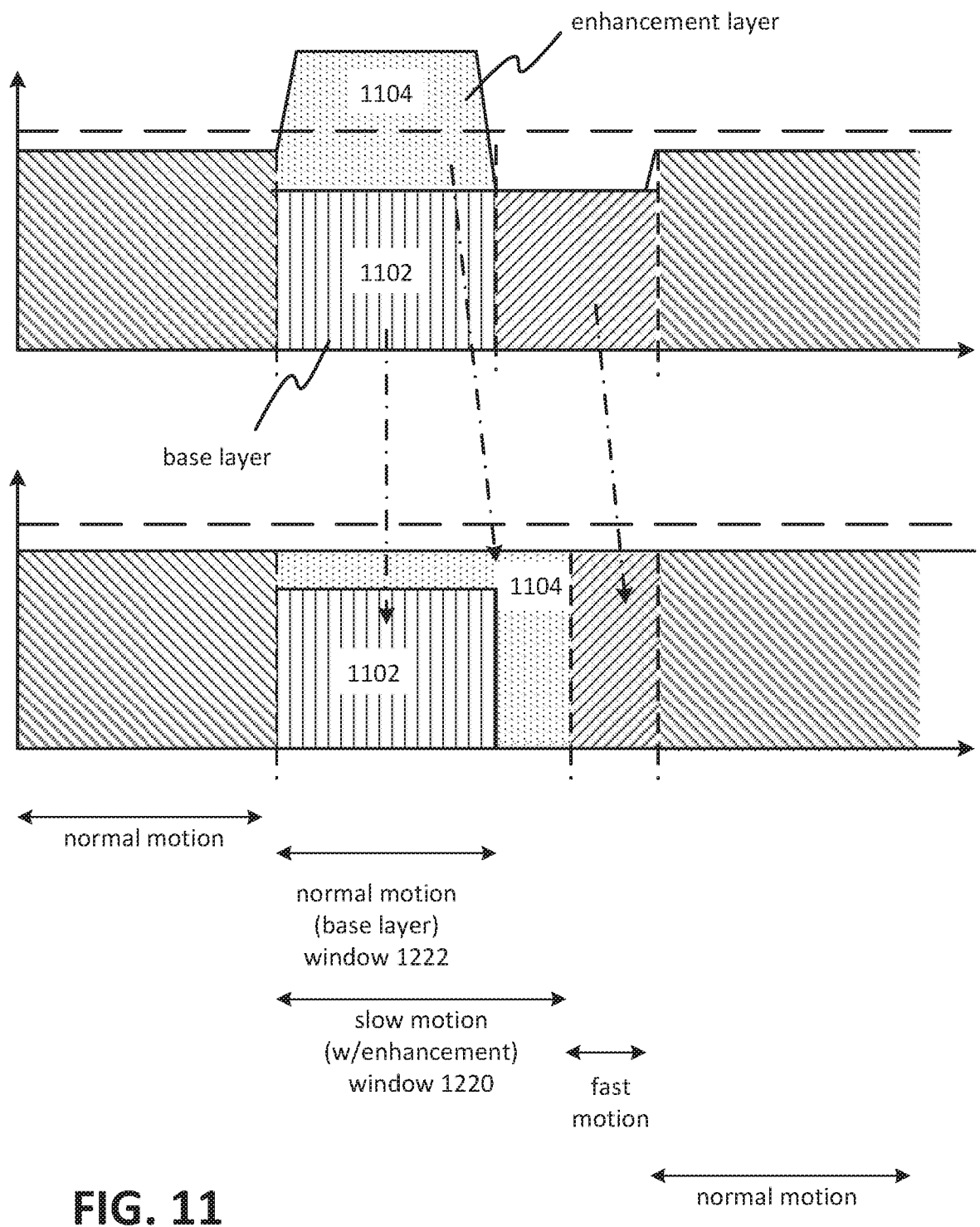
FIG. 11 illustrates bit rates before, during and after an event in another embodiment.
Figure 12:
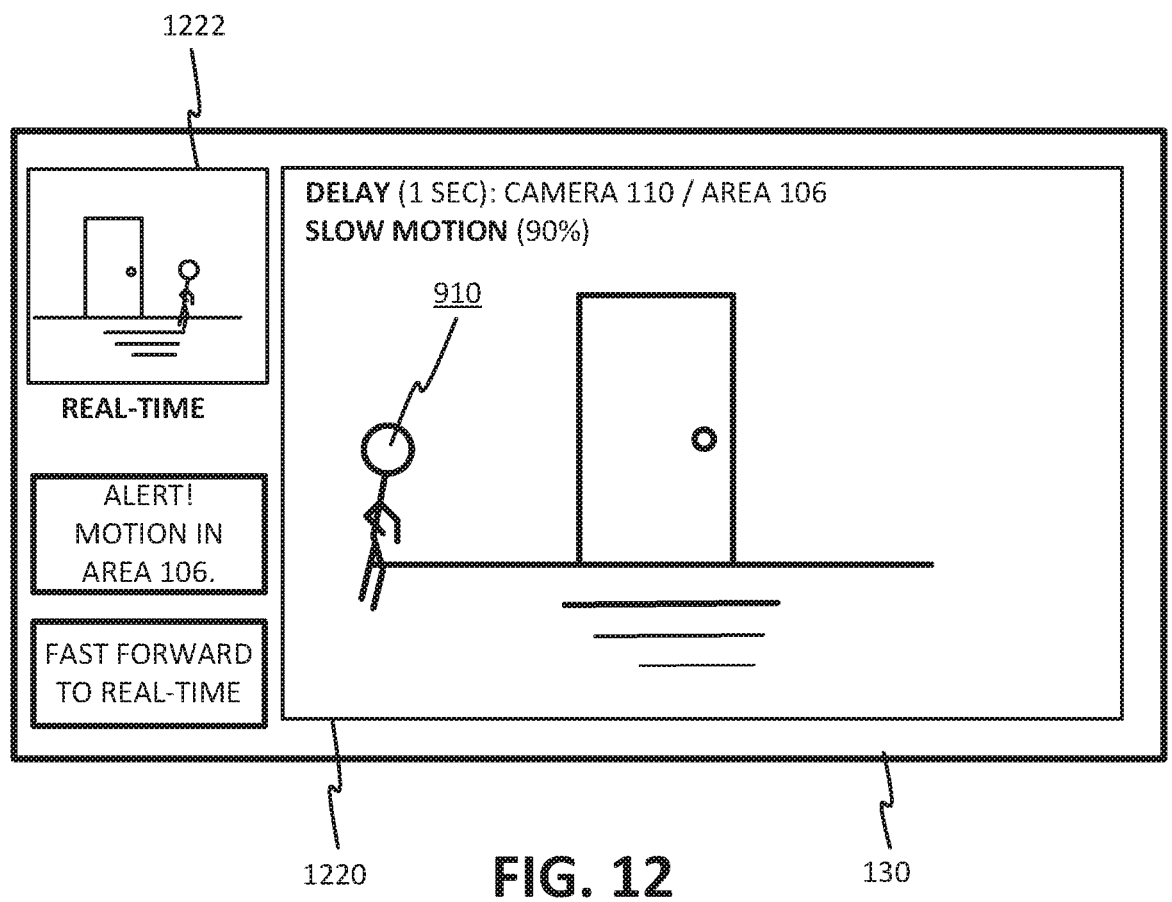
FIG. 12 illustrates what an operator may see on a display during an event in the embodiment of FIG. 11.

FIG. 11 illustrates bit rates before, during and after an event in another embodiment. As shown in FIG. 11, during the event the video stream may be split into two: a base layer 1102 and an enhancement layer 1104. Base layer 1102 is a lower-quality version of the video that can be enhanced with the enhancement layer 1104 to achieve a higher-quality version of the video. Base layer 1102 may be transmitted at the real-time transmission rate, whereas the enhancement layer 1104 may be transmitted at a rate lower than the real-time transmission rate. In this case, buffer 408 may be filled with enhancement layer 1104. As a result, monitoring station 125 may display both a higher quality (and slow motion) version of the video at the same time as displaying a lower-quality (actual or normal motion speed) version of the video. After the event has ended, buffer 408 may be emptied and transmitted to monitoring station 125 at channel capacity. FIG. 12 illustrates what an operator may see on a display during an event in the embodiment of FIG. 11. In FIG. 12, display 130 includes a small window 1122 with a real-time (normal motion) lower-quality view of area 106. Display 130 also includes a larger window 1122 with a slow-motion, higher-quality view of area 106.

Figure 13:
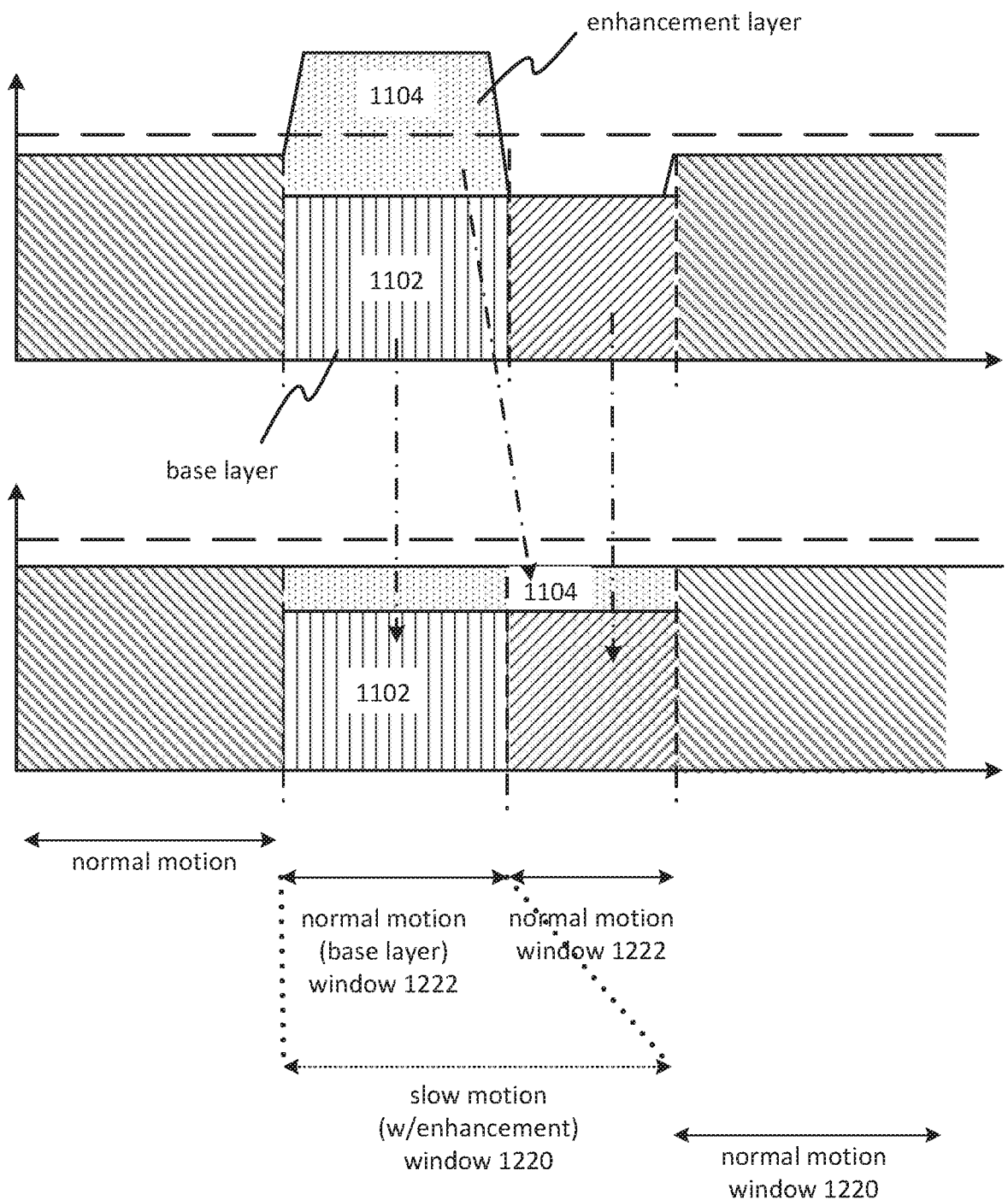
FIG. 13 illustrates bit rates before, during and after an event in another embodiment.

FIG. 13 illustrates bit rates before, during and after an event in another embodiment. As shown in FIG. 13 (similar to FIG. 11), during the event the video stream may be split into two: a base layer 1102 and an enhancement layer 1104. In the case of FIG. 13, base layer 1102 may be transmitted at the real-time transmission rate, whereas the enhancement layer 1104 may be transmitted at a rate lower than the real-time transmission rate over without interrupting the low-quality transmission (as in FIG. 11). As a result, monitoring station 125 may display both a higher quality (and slow motion) version of the video at the same time as displaying a lower-quality (actual or normal motion speed) version of the video.

In one embodiment, if the video stream includes audio then the audio may also be time stretched (e.g., when the video is time stretched) or time compressed (e.g., when the video is time compressed) in a way that the audio pitch does not change. That is, even though the video may be played in slow motion and/or fast motion by monitoring station 125, the audio pitch does not shift downward or upward. Adjustment to the audio, if implemented, may be performed by decoder 602 in monitoring station 125. Alternatively, adjustment to the audio may be performed by encoder 406 in camera 110 and/or VMS 150.

The monitoring system (such as operator 704 in environment 100) may exclude audio from the video stream. For example, operator 704 may view more than one video stream on display 130. In this situation, playing more than one audio stream may be confusing to operator 704. As a result, camera 110 and/or VMS 150 may include the ability to omit audio from any video stream (e.g., at the source). Audio may not be desirable for other reasons as well (e.g., the audio may not be relevant or to conserve bandwidth). Methods and systems described above may exclude audio from the video stream (in which case a pitch adjustment to the audio would not be necessary during slow motion or fast motion).

In another embodiment, the methods and systems described above may be applied to audio streams that do not accompany video streams. That is, when an audio stream bitrate exceeds a threshold (or when an event is detected) (similar to block 808), then the audio bitrate may be transmitted at a rate lower than the real-time rate (e.g., while a buffer is being used) (similar to blocks 810 to 813). When the event is over (similar to block 814), the audio bitrate may be decreased and transmitted at a rate higher than the real-time rate (similar to blocks 816 to 820).

As disclosed above, methods and systems described herein may enable a monitoring system to increase a video stream bitrate (e.g., to include additional motion information or increased quality) without necessarily overwhelming the network and dropping packets. Instead, the embodiments described below may enable the operator to view the event at with the higher bitrate a higher quality in slow motion, for example. These methods and systems may also reduce the quality of the video to prevent the bitrate from increasing (e.g., by reducing framerate, image quality, or motion capture).

In the preceding description, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to the figures with flowcharts, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A method comprising:
    transmitting an encoded video bitstream through a network transmission channel, wherein the network transmission channel is associated with a maximum transmission bitrate;
    detecting an event associated with live video data captured by a camera, wherein the event has a start time and an end time;

before the start time of the event, the method comprises:
encoding the captured live video data into an encoded video bitstream set to have a first output video bitstream bitrate, the first output video bitstream bitrate being below the maximum transmission bitrate of the network transmission channel, and
transmitting the encoded video bitstream having the first output video bitstream bitrate through the network transmission channel at a transmission bitrate being lower than the maximum transmission bitrate, thereby enabling real-time communication;
during the event, the method comprises:
encoding the captured live video data into an encoded video bitstream set to have a second output video bitstream bitrate, the second output video bitstream bitrate being above the maximum transmission bitrate of the network transmission channel,
buffering the encoded video bitstream having the second output video bitstream bitrate, and
transmitting the encoded video bitstream having the second output video bitstream bitrate through the network transmission channel at a transmission bitrate being lower than the second output bitstream bitrate, thereby introducing a time stretch to the encoded video bitstream having the second output video bitstream bitrate; and
after the end time of the event, the method comprises:
encoding, by the encoder, the captured live video data into an encoded video bitstream set to have a third output video bitstream bitrate, the third output video bitstream bitrate being below the maximum transmission bitrate of the network transmission channel, and
transmitting the encoded video bitstream having the third output video bitstream bitrate through the network transmission channel at a transmission bitrate higher than the third output video bitstream bitrate until the buffer is emptied, thereby catching up to compensate for the time stretch introduced during the event.

2. The method of claim 1, wherein the buffer is an application-layer buffer.

3. The method of claim 1, further comprising:
determining the maximum transmission bitrate of the network transmission channel.

4. The method of claim 1, wherein during the event, the method further comprises:
receiving, at a monitoring station, the encoded video bitstream having the second output video bitstream bitrate;
decoding the encoded video bitstream having the second output video bitstream bitrate into a video; and
displaying the video on a display in slow-motion corresponding to the time stretch.

5. The method of claim 4, wherein after the end time of the event, the method further comprising:
receiving, at the monitoring station, the encoded video bitstream having the third output video bitstream bitrate;
decoding the encoded video bitstream having the third output video bitstream bitrate into the video; and
displaying the video on a display in fast motion.

6. The method of claim 1,
wherein the second output video bitstream bitrate is higher than the first output video bitstream bitrate.

7. The method of claim 1,
wherein the third output video bitstream bitrate is lower than the first output video bitstream bitrate.

8. The method of claim 1,
wherein before the start time of the event, encoding the captured live video data into the encoded video bitstream set to have the first output video bitstream bitrate comprises adjusting a quality factor based on the maximum transmission bitrate of the network transmission channel;
wherein during the event, encoding the captured live video data into the encoded video bitstream set to have the second output video bitstream bitrate comprises increasing the bitrate; and
wherein after the end time of the event, encoding the captured live video data into the encoded video bitstream set to have the third output video bitstream bitrate comprises reducing the bitrate.

9. The method of claim 8, wherein
reducing the bitrate after the end time of the event comprises reducing a quality factor; and
increasing the bitrate during the event comprises increasing a quality factor; and
wherein the quality factor includes a framerate, a quantization parameter, or a resolution of images.

10. The method of claim 1, wherein detecting the event associated with the live video data includes:
detecting motion in live video data,
detecting a bitrate increase in the encoded video bitstream having the first output video bitstream bitrate,
receiving an event message in a control system, or
receiving an event message in a physical-access control system.

11. A device comprising:
a processor to detect an event associated with live video data captured by a camera;
an encoder configured to encode the live video data into an encoded video bitstream;
a memory configured to buffer the encoded video bitstream; and
a transmitter to send the encoded video bitstream through a network transmission channel, wherein the network transmission channel is associated with a maximum transmission bitrate;
wherein before the processor has detected an event:
the encoder is set to encode the captured live video data into an encoded video bitstream having a first output video bitstream bitrate, the first output video bitstream bitrate being below the maximum transmission bitrate of the network transmission channel, and
the transmitter is configured to send the encoded video bitstream having the first output video bitstream bitrate through the network transmission channel at a transmission bitrate, thereby enabling real-time communication;
wherein during an event:
the encoder is configured to encode the live video data into an encoded video bitstream having a second output video bitstream bitrate, the second output video bitstream bitrate being above the maximum transmission bitrate of the network transmission channel,
the memory is configured to buffer the encoded video bitstream having the second output video bitstream bitrate, and
the transmitter is configured to send the encoded video bitstream having the second output video bitstream bitrate at a transmission bitrate being lower than the second output video bitstream bitrate, thereby introducing a time stretch to the encoded video bitstream having the second output video bitstream bitrate, and wherein after the event:

the encoder is configured to encode the captured live video data into an encoded video bitstream having a third output video bitstream bitrate, the third output video bitstream bitrate being below that maximum transmission bitrate of the network transmission channel, and the transmitter is configured to send the encoded video bitstream having the third output video bitstream bitrate through the network transmission channel at a transmission bitrate being higher than the third output video bitstream bitrate until the memory is emptied, thereby catching up to compensate for the time stretch introduced during the event.

12. The device of claim 11, wherein the memory configured to buffer is an application-layer buffer.

13. The device of claim 11, wherein the processor is configured to determine a maximum transmission bitrate of the network transmission channel.

14. The device of claim 11, further comprising:
a receiver, at a monitoring station, to acquire the encoded video bitstream having the second output video bitstream bitrate;
a decoder to decode the encoded video bitstream having the second output video bitstream bitrate into a video; and
a display to present, during the event, the video in slow-motion corresponding to the time stretch.

15. The device of claim 14, wherein the display is configured to present the video corresponding to after the event on a display in fast motion.

16. The device of claim 11, wherein the second output video bitstream bitrate is higher than the first output video bitstream bitrate.

17. The device of claim 11, wherein the third output video bitstream bitrate is lower than the first output video bitstream bitrate.

18. The device of claim 11, wherein before a start time of the event, the encoder is configured to encode the captured live video data into the encoded video bitstream having a first output video bitstream bitrate by adjusting a quality factor based on the maximum transmission bitrate of the network transmission channel;
wherein during the event, the encoder is further configured to encode the captured live video data into the encoded video bitstream having the second output video bitstream bitrate by increasing the bitrate; and
wherein after the end time of the event, the encoder is further configured to encode the captured live video data into the encoded video bitstream having the third output video bitstream bitrate by reducing the bitrate.

19. The device of claim 18, wherein the encoder is configured to reduce the bitrate after the end of time of the event by reducing the quality factor;
wherein the encoder is configured to increase the bitrate during the event by increasing the quality factor; and
wherein the processor is configured to adjust the quality factor by reducing a framerate, a quantization parameter, or a resolution of images.

20. The device of claim 11, wherein the processor is configured to detect the event associated with the live video data by:
detecting motion in the live video data,
detecting a bitrate increase in the encoded video bitstream having the first output video bitstream bitrate,
receiving an event message in a control system, or
receiving an event message in a physical-access control system.

\* \* \* \* \*